(12) United States Patent
Hayashi et al.

(10) Patent No.: US 7,617,854 B2
(45) Date of Patent: Nov. 17, 2009

(54) METHOD FOR MANUFACTURING A PNEUMATIC TIRE AND A PNEUMATIC TIRE OBTAINED THEREBY

(75) Inventors: Norio Hayashi, Kobe (JP); Masanori Takahashi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 510 days.

(21) Appl. No.: 11/187,817

(22) Filed: Jul. 25, 2005

(65) Prior Publication Data

US 2006/0042737 A1    Mar. 2, 2006

(30) Foreign Application Priority Data

Aug. 26, 2004  (JP)  ............... 2004-247172
Nov. 9, 2004   (JP)  ............... 2004-325391

(51) Int. Cl.
B60C 11/00 (2006.01)
B29D 30/60 (2006.01)

(52) U.S. Cl. ................. 152/209.5; 152/209.1; 156/117; 156/130

(58) Field of Classification Search ................. 156/117, 156/130, 397; 152/531, 533, 209.1, 209.5
See application file for complete search history.

(56) References Cited

U.S. PATENT DOCUMENTS

| 3,223,572 A | 12/1965 | Hollaway et al. |
| 4,990,203 A | 2/1991 | Okada et al. |
| 5,032,198 A * | 7/1991 | Kojima et al. ............... 156/117 |

FOREIGN PATENT DOCUMENTS

| EP | 0 712 739 A1 | 5/1996 |
| EP | 1 186 401 A2 | 3/2002 |
| JP | 2002-46194 A | 2/2002 |
| JP | 3352045 B2 | 9/2002 |
| JP | 3370282 B2 | 11/2002 |
| JP | 3397430 B2 | 2/2003 |
| JP | 3477289 B2 | 9/2003 |
| JP | 2004-25535 A * | 1/2004 |

* cited by examiner

Primary Examiner—Geoffrey L Knable
(74) Attorney, Agent, or Firm—Birch, Stewart, Kolasch & Birch, LLP

(57) ABSTRACT

It is a subject to provide a method for manufacturing a tire rubber member and a pneumatic tire using the same capable of improving productivity and of accurately finishing sectional shapes. The method includes: a step of fixedly attaching winding start points 8As, 8Bs of a first rubber strip 8A and a second rubber strip 8B at positions located further inside in a width direction than respective sides e1, e2 of a rubber member R; a first winding step of forming a first layer 10 by spirally winding the first rubber strip 8A towards the one side e1 and the second rubber strip 8B towards the other side e2 up to the respective sides e1, e2; a second winding step of respectively turning the first rubber strip 8A up at the one side e1 and the second rubber strip 8B at the other side e2 so as to successively form a second layer 11 outside of the first layer 10; and a step of fixedly attaching a winding end point 8Af of the first rubber strip and a winding end point 8f of the second rubber strip to positions further inside in the width direction than the respective sides e1, e2.

8 Claims, 17 Drawing Sheets

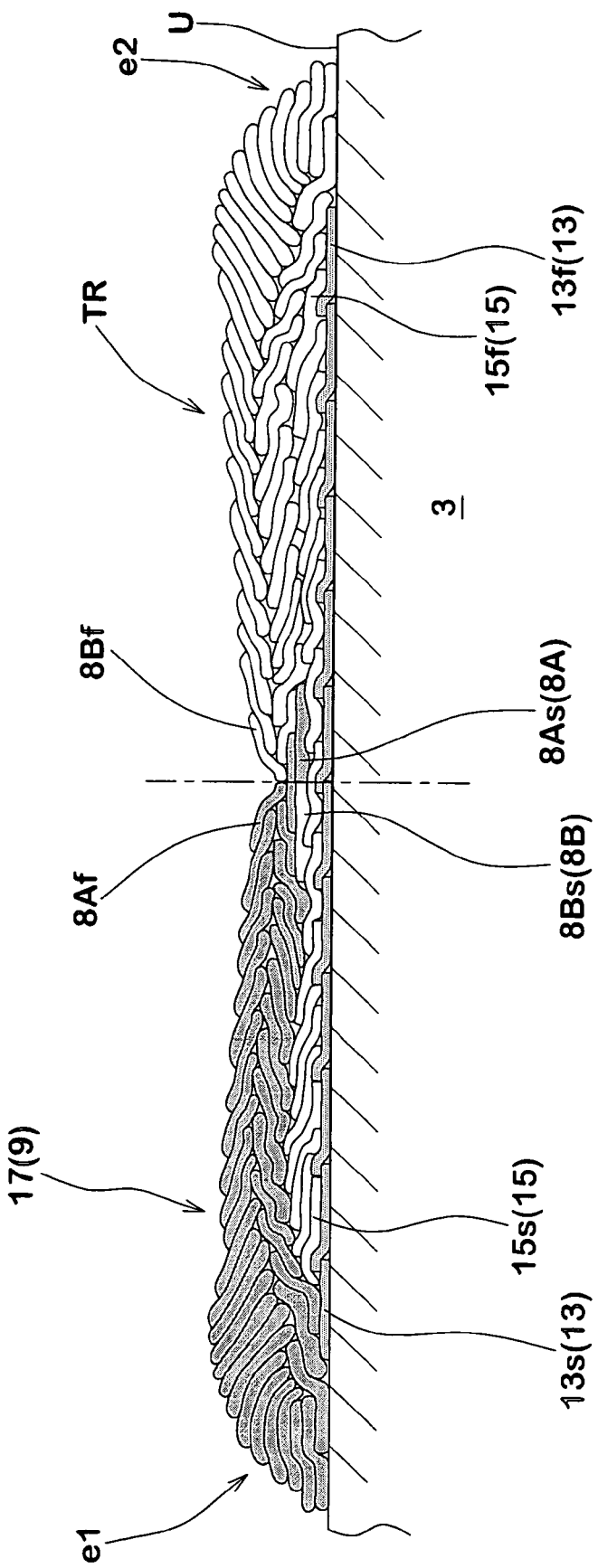

X—X Section

Y—Y Section

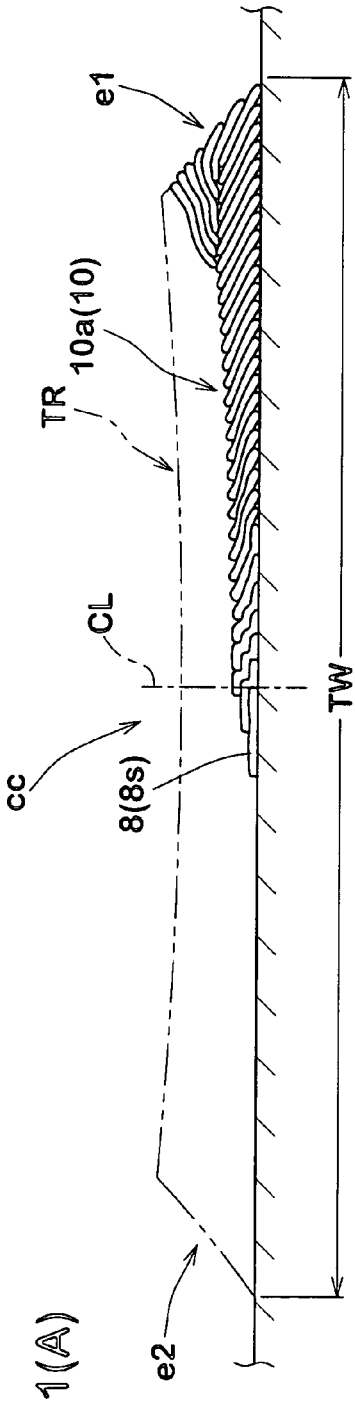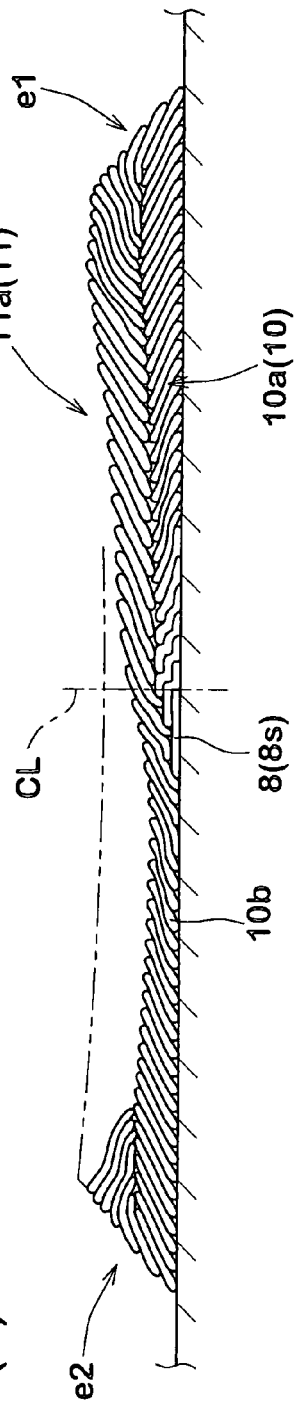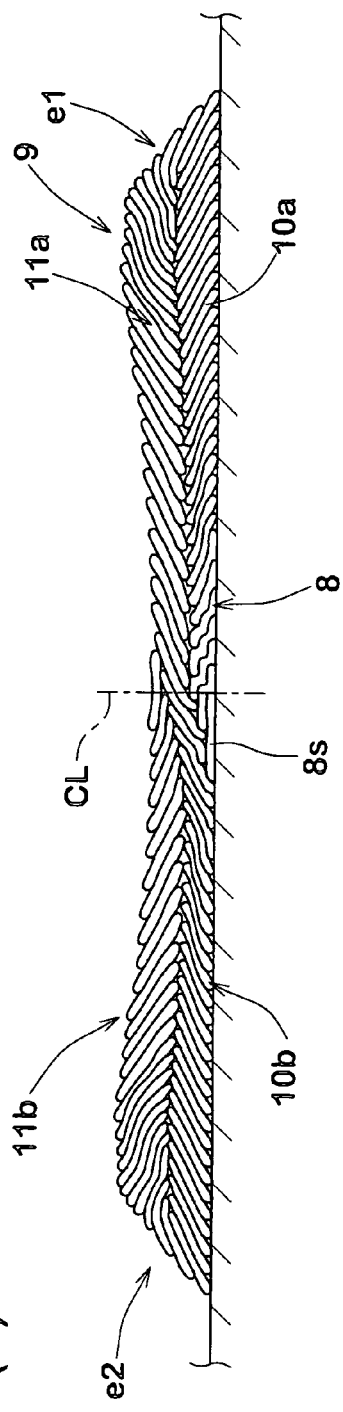

METHOD FOR MANUFACTURING A PNEUMATIC TIRE AND A PNEUMATIC TIRE OBTAINED THEREBY

BACKGROUND OF THE INVENTION

The present invention relates to a method for manufacturing a pneumatic tire including a tire rubber member of accurate sectional shape and with which it is possible to improve productivity, and to a pneumatic tire obtained thereby.

There is recently suggested a strip-wind method as illustrated in FIGS. 14 to 16. In the strip-wind method, there is formed a wound body in which a ribbon-like non-vulcanized rubber strip g is spirally wound around an object c to be wound. A green tire employing such a wound body is vulcanized and molded. In this manner, the wound body can comprise a tire rubber member such as a tread rubber tr. Such strip-wind method is suggested in, for instance, Japanese Patent No. 3,477,289, Japanese Patent No. 3,352,045, Japanese Patent No. 3,370,282 and Japanese Patent No. 3,397,430. The object c to be wound onto which the rubber strip g is wound can be a shrinkable mold former of cylindrical shape or a tread portion of a green tire in a condition in which a belt layer is wound around a green carcass.

In such a strip-wind method, a rubber member of arbitrary sectional shape can be formed by changing a winding pitch of the wound in the overlapped rubber strip. It will accordingly be possible to omit preparing extruding nozzle caps of specific sectional shapes for respective tires and exchanging operations of the caps, so that improvements in productivity can be expected, unlike a conventional integral extruding method.

FIGS. 13 to 16 illustrate some examples of sections of green tread rubber tr that are employed as conventional tire rubber members for forming a tread rubber. FIG. 13 illustrates an integral extruded article tr1 that has been integrally extruded from an extruder through a non-strip-wind method.

All of the tread rubbers as illustrated in FIGS. 14 to 16 have been manufactured by using the strip-wind method. The tread rubber tr2 of FIG. 14 is formed by spirally winding a single successive rubber strip g around a cylindrical object to be wound c in one direction from one side e1 to the other side e2. The tread rubber tr3 of FIG. 15 employs two separate rubber strips g1, g2. The one rubber strip g1 is spirally wound from one side e1 and the other rubber strip g2 from the other side e2 towards the center, respectively. Respective winding end points f1, f2 are located at substantially central portions in the width (width central portion). In FIGS. 14 and 15, the rubber strip g is illustrated in a schematic form with spaces being formed therebetween for ease of understanding.

The tread rubber tr4 of FIG. 16 employs two independent rubber strips g1, g2. The one rubber strip g1 is wound from a width central position of the tread rubber tr4 towards the one side e1 and the other rubber strip g2 from the width central position towards the other side e2, respectively.

The tread rubber tr thus obtained through a conventional strip-wind method is arranged, as illustrated in FIG. 17 in a plan view, in that the winding start point s and/or the winding end point f of the rubber strip g is/are located at sides e1, e2 of the wound body. It is accordingly the case that a stepped non-continuous portion k that comprises a corner when seen in a planar view is apt to occur between an end surface and an side of an adjoining rubber strip at the winding start point s and the winding end point f of the rubber strip g. Such non-continuous portions k lead to a drawback in that lateral sections of tread rubbers tr become non-uniform in the tire circumferential direction to thus worsen tire uniformity.

The winding start point s and the winding end point f of the rubber strip g are apt to peeling than other parts thereof. Accordingly, when those points are located at sides of the tread rubber etc, drawbacks are presented in that cracks or rubber chippings tend to occur from those portions after vulcanization.

On the other hand, there is also a case as illustrated in FIG. 18 in which the rubber strip g is spirally wound around by a single round in one direction from one side in the width direction to the other side similar to the case of FIG. 14. In such a wound body, the spiral winding pitch P of the rubber strip g will be extremely small for achieving a sufficient thickness. The rubber strip g is thus largely inclined obliquely in its sectional shape when being wound. A large peripheral velocity difference is generated between an outer end edge o and an inner end edge i of the rubber strip g in the radial direction. As a result, the rubber strip g tends to be pulled by the outer end edge o which peripheral velocity is large when being wound. It is difficult to wind the rubber strip g at specified positions in an accurate manner. Due to those facts, it is difficult to adjust the thickness (gauge) of respective parts of the tread rubber tr so that irregularities are apt to occur in the sectional shape in the above-mentioned method.

In the case of FIG. 18, the tread rubber tr is arranged in that both the winding start point s and the end point f of the rubber strip g are positioned at end portions of the tread rubber tr in the tire axial direction. The gauge at the end portions of the tread rubber tr will thus not become uniform in the tire circumferential direction. Since the tread rubber tr has a sectional shape in which its thickness gradually decreases in approaching outward of the tire axial direction, irregularities in gauge at end portions of the tread rubber will largely affect uniformity and other factors.

Referring to a concrete example, where portions of a thickness of 3 mm and portions of a thickness of 2 mm are formed at end portions of a tread rubber tr which are of small thickness, the irregularities of this gauge will amount to 33%. However, where portions of a thickness of 10 mm and portions of a thickness of 9 mm are formed at a central portion of the tread rubber tr which is of large thickness, the range of irregularity will be 10% so that influences on the uniformity will be relatively small.

Non-uniformity of gauges at end portions of the tread rubber tr (end portions of the wound body) is not desirable since they conspicuously worsen the uniformity of the tire and degrade the durability of the tire.

BRIEF SUMMARY OF THE INVENTION

An object of the present invention is to provide a method for manufacturing a pneumatic tire and a pneumatic tire that exhibits improved productivity, uniformity and durability by specifying positions of winding start points and winding end points of rubber strips.

Another object of the invention is to provide a method for manufacturing a pneumatic tire and a pneumatic tire which serve to accurately finish sectional shapes while improving the productivity of the tread rubber on the basis of an arrangement in which rubber strips are spirally wound from an inner portions to side portions in a width direction and in which they are turned up at the side portions towards the central portion without being cut.

The present invention is a method for manufacturing a pneumatic tire for manufacturing a pneumatic tire including a tire rubber member formed by using a annular wound body obtained by winding a ribbon-like non-vulcanized rubber strips in a spiral manner, and the method including:

a step of fixedly attaching a winding start point of a first rubber strip and a winding start point of a second rubber strip to the object to be wound at positions located inward in a width direction from respective sides of the wound body, a first winding step for forming a first layer by spirally winding the first rubber strip towards one side up to the one side and by spirally winding the second rubber strip towards the other side up to the other side, a second winding step for successively forming a second layer outside of the first layer by turning the first rubber strip up and spirally winding the same towards the other side without cutting the same at the one side and by turning the second rubber strip up and spirally winding the same towards the one side without cutting the same at the other side, and a step of fixedly attaching a winding end point of the first rubber strip and a winding end point of the second rubber strip at positions located inward in the width direction than the respective sides.

In this manner, the method of the present invention includes a step of fixedly attaching the winding start point of the first rubber strip and the winding start point of the second rubber strip to the object to be wound at positions located inward in the width direction than the respective sides of the wound body (tire rubber member). With this arrangement, the winding start points of the respective rubber strips will not be located at the sides of the rubber member.

By including the first winding step of the above-discussed arrangement and a second winding step in which a second layer is successively formed outside of the first layer obtained by this step, it is possible to form a rubber member of relatively large thickness in a short time and in an efficient manner.

According to the present invention, the winding end point of the first rubber strip and the winding end point of the second rubber strip are fixedly attached at positions inward in the width direction than the respective sides. Accordingly, the winding end points of the rubber strips will not be located at the sides of the rubber member, either. The rubber member for a tire obtained in accordance with the present invention is thus capable of improving uniformity of the tire and durability of the rubber member.

According to the present invention, the winding start points of the first and second rubber strips can be made positioned at a width central portion of the wound body. The winding end points of the first and second rubber strips also can be made positioned at the width central portion of the wound body.

In the case that the start points and end points of winding of the rubber strip are located at the width central portion, it becomes easy to uniformize the gauge through the width of the tread rubber including end portions in the width direction. It is accordingly possible to easily manufacture a pneumatic tire of improved uniformity when compared to the prior art.

In addition thereto, it is a subject of the present invention to provide a pneumatic tire that is manufactured by the above-described method for manufacturing a pneumatic tire and to provide a pneumatic tire of favorable productivity that is capable of improving the uniformity of the tire and the durability of the rubber member.

BRIEF DESCRIPTION OF THE SEVERAL VIEWS OF THE DRAWINGS

FIG. 7 is a sectional view illustrating another example of a wound body for a tread rubber including an under layer and a middle layer;

FIGS. 11(A) to 11(C) are sectional views for explaining other steps for forming a wound body for a tread rubber;

DETAILED DESCRIPTION OF THE INVENTION

An embodiment of the present invention will now be explained on the basis of the drawings.

Figure 1:
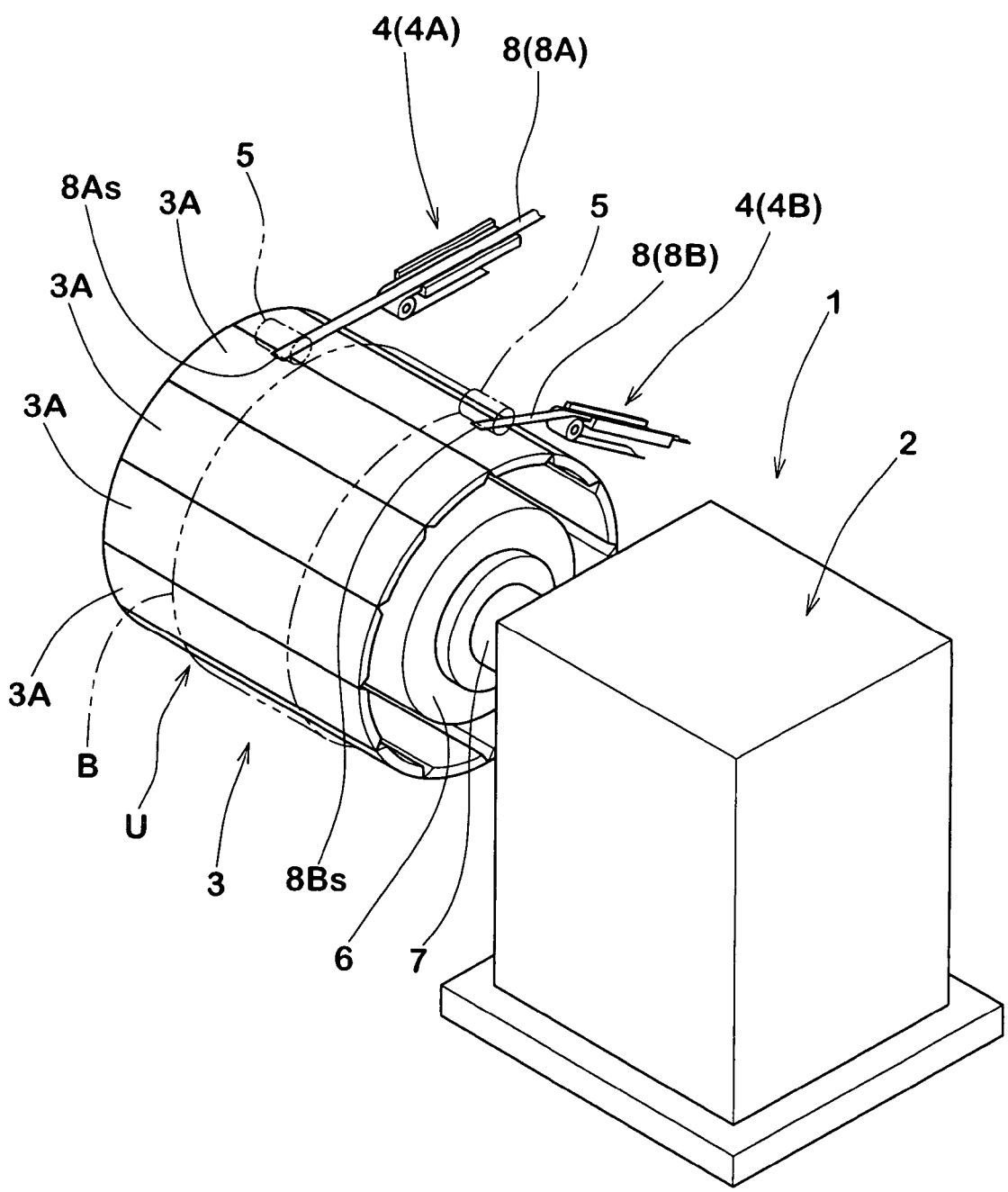
FIG. 1 is a perspective view illustrating a device for forming a rubber member that is employed in a method of the present invention.

FIG. 1 illustrates a molding device 1 for molding a wound body for forming a tire rubber member in a method for manufacturing a pneumatic tire according to the present invention. The molding device 1 is arranged to include a base 2, a cylindrical molding former 3 rotatively supported on the base 2, and applicators 4 capable of supplying rubber strips 8 to the molding former 3.

The base 2 is internally equipped with an electric motor and a power transmission device for transmitting torque to the molding former 3. The torque of the electric motor is output to a rotating shaft 7 supported sideward of the base 2.

Figure 2:
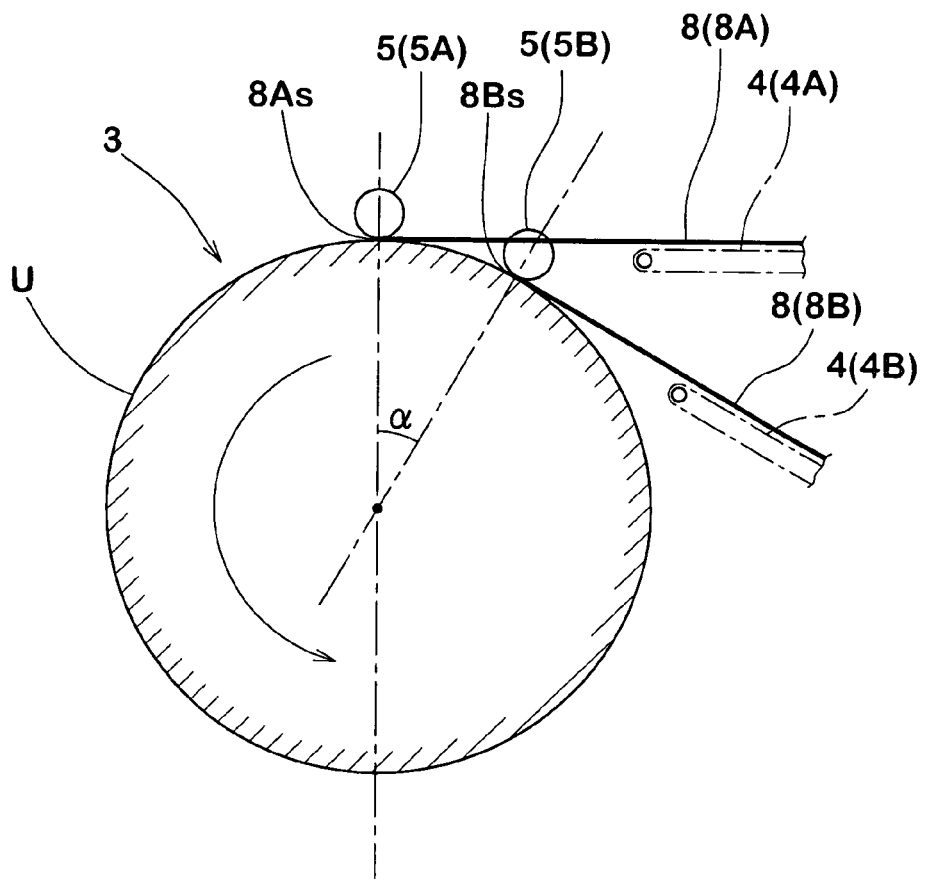
FIG. 2 is a diagram illustrating a schematic side surface thereof.

The molding former 3 includes a plurality of segments 3A aligned in a circumferential direction and an expanding/shrinking mechanism 6 (not illustrated in details) that is provided inside thereof for moving the segments 3A in- and outside in the radial direction. The segments 3A can be moved by the expanding/shrinking mechanism 6 outside in the radial direction, and radial positions of outer surfaces of the segments 3A are arranged to be uniform at moving positions. With this arrangement, a cylindrical molding surface U is formed as illustrated in FIG. 2. In this respect, for forming a rubber member including a curvature in an axial directional section, the molding surface U may be formed as a curved surface such as a medium-thick cylindrical form or a medium-thin cylindrical form. The outer surfaces of the segments 3A aligned in a cylindrical form upon being expanded in diameter to specific positions form a molding surface U while the segments 3A comprise an object to be wound.

For instance, adjoining pairs of segments 3A are moved inside in the radial direction while mutually varying their inner positions in the radial direction. With this arrangement, the molding surface U can be shrunk in diameter without interference. This serves to detach the rubber member that has been wound to the molding surface U from the molding former 3. Moreover, since the expanding/shrinking mechanism 6 is fixedly attached to the rotating shaft 7, the molding former 3 can be rotated at the velocity of the rotating shaft 7 and can be terminated. The diameter of shrinkage of the segments 3A and the molding former 3 are suitably adjusted by means of a controller (not shown).

Each applicator 4 comprises a conveyer portion and through its transfer surface, the ribbon-like non-vulcanize rubber strip 8 is successively supplied to the molding surface U of the molding former 3. On an upstream side of the applicator 4, there are provided a rubber extruder or a calendar device (both of which are not shown) for successively extruding the rubber strip 8 and a festoon capable of temporally controlling a supply velocity of the rubber strip. The applicators 4 are provided in a suitably moveable manner with respect to the molding former 3 by being supported by means of, for instance, a three-dimensional moving devices (not shown).

The molding device 1 further includes a first applicator 4A and a second applicator 4B that are shifted in positions in the axial direction and in the circumferential direction. The first applicator 4A is capable of successively supplying a first rubber strip 8A with respect to the molding former 3. The second applicator 4B is capable of successively supplying a second rubber strip 8B, which is supplied independently from the first rubber strip 8A, to the molding former 3.

Figure 3:
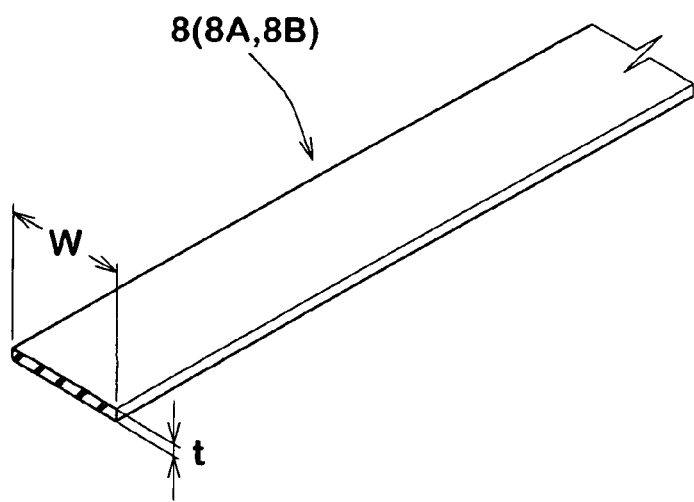
FIG. 3 is a perspective view illustrating a rubber strip.

The rubber strip 8 has a ribbon-like shape that is substantially rectangular in section in this case with a width W being large relative to its thickness t as illustrated, for instance, in FIG. 3. While not particularly limited, the width W of the rubber strip 8 is preferably a width of 15 to 35 mm. While the thickness t is not particularly limited, it is preferably 0.5 to 1.5 mm. Where the width W of the rubber strip 8 is less than 15 mm or the thickness t is less than 0.5 mm, the number of winding the rubber strip 8 increases when a rubber member is formed by spirally winding, resulting in the productivity being decreased. On the other hand, when the width W exceeds 35 mm or the thickness t exceeds 1.5 mm, it will be difficult to form minute sectional shapes. In this present embodiment, rubber strips of identical rubber composition and of identical sectional shape are employed as the first rubber strip 8A and the second rubber strip 8B.

Figure 9:
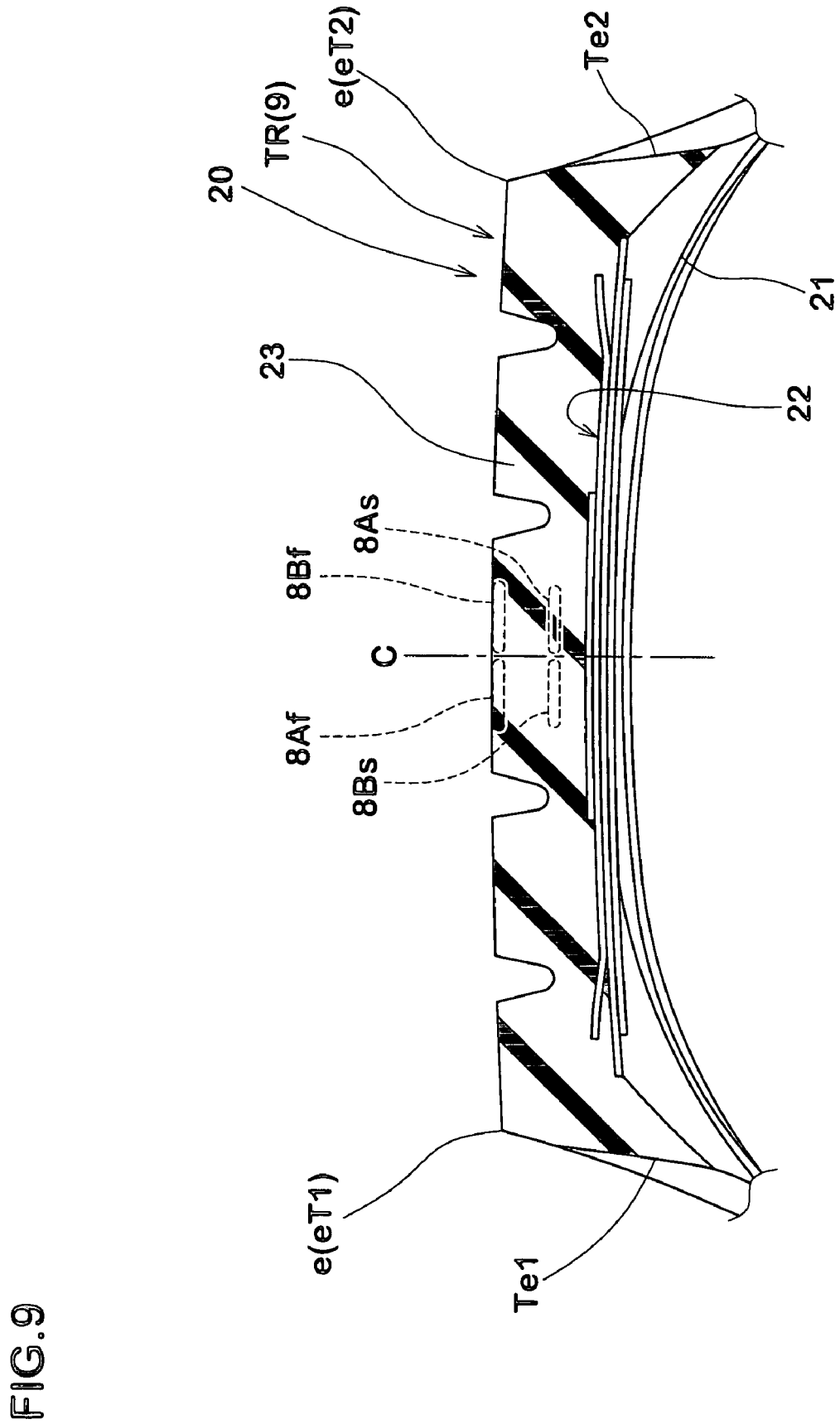
FIG. 9 is an enlarged view of a tread portion of a pneumatic tire that is manufactured in accordance with the method of the present invention.

FIG. 4(A) to 4(E) illustrates one example for manufacturing a wound body 9 for forming a tread rubber TR (as illustrated in FIG. 9) which is one example of a tire rubber member. The tread rubber TR is illustrated by a virtual line. The virtual contour line is a target sectional shape for the wound body 9 and has a width that extends from one side e1 to the other side e2 in the tire axial direction. In this respect, where deformations take place in the course of formation from the wound body 9 to the tread rubber TR, the wound body 9 is corrected in consideration of the value of changing thereof. Here, it is presumed that it does not change.

Figure 4A:
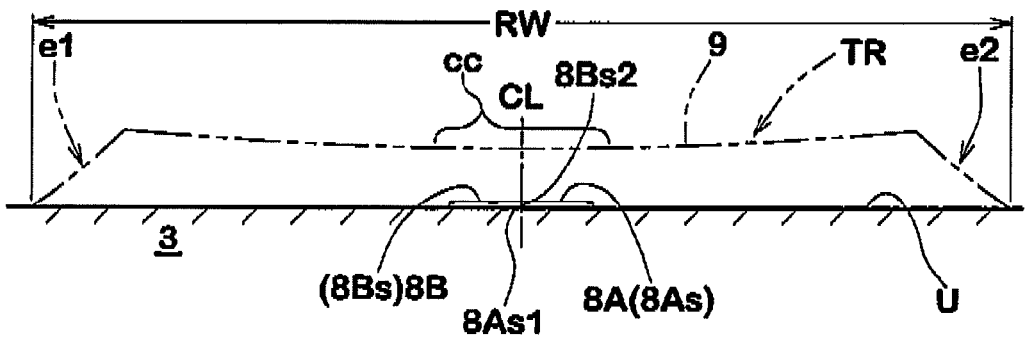
FIGS. 4(A) to 4(E) are sectional diagrammatic views for explaining steps for forming a wound body.
Figure 4B:
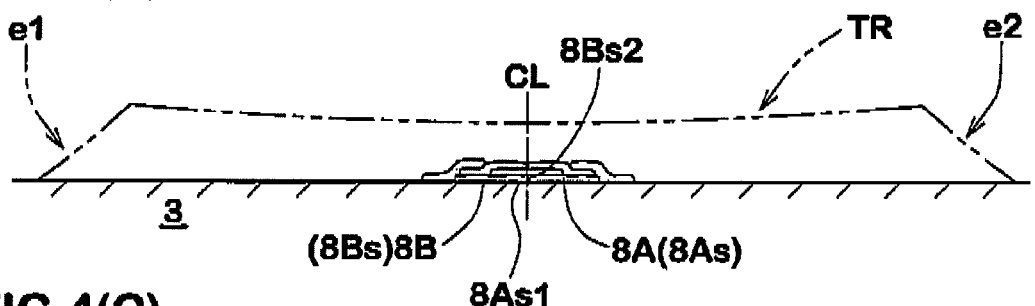
Figure 4C:
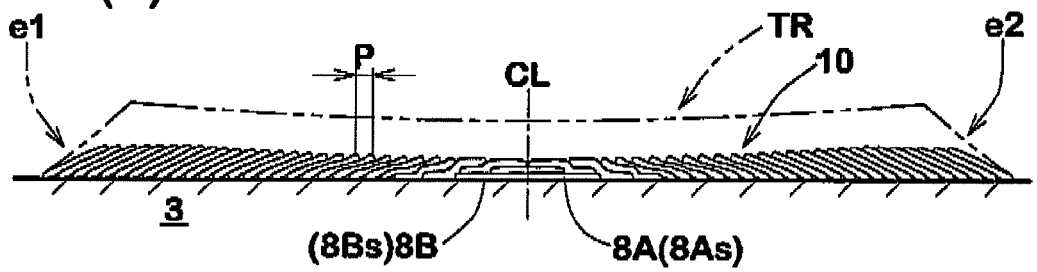
Figure 4D:
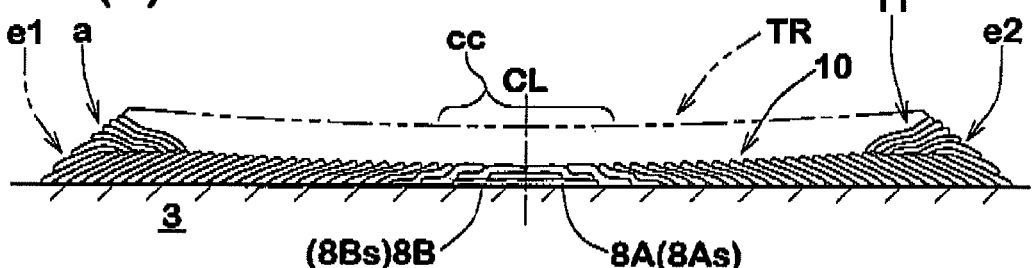

A start point fixing process of fixedly attaching the respective winding start points 8As, 8Bs of the first rubber strip 8A and the second rubber strip 8B to the object to be wound at positions inside in the width direction than the respective sides e1, e2 is first performed. The one and other sides e1, e2 are concretely determined on the basis of the contour line. For instance, the sides e1, e2 are defined to indicate both side surfaces in the width direction where a substantially trapezoid shape as illustrated in FIG. 4(A) or a substantially rectangular shape is employed. A width between the one side e1 and the other side e2 is defined to indicate a largest width RW between the sides.

Since the molding surface U of the object to be wound is formed of metallic segments 3A in the present embodiment, it is not deformed when winding the rubber strips 8 but serves to form a wound body 9 of favorable accuracy. As further illustrated by the virtual line in FIG. 1, it is also possible to wind a belt ply B in advance or similar around the molding surface U.

The object to be wound may be, besides the molding surface U of the molding former 3, a non-vulcanized green carcass maintained in a cylindrical shape or a green carcass wound with a belt ply. It is possible to directly wind the rubber strips 8 around these. In such an instance, it is desirable to support the green carcass from inside by using a retainer or similar in a non-deformable manner so that the green carcass does not deform through the tensile strength of the rubber strips 8. In this specification, a "non-vulcanized" condition of a rubber denotes a condition in which vulcanization has not been completely finished. Accordingly, a merely pre-vulcanized object is also defined to be in a non-vulcanized state.

The wound body 9 for forming the tread rubber TR that is formed on the molding former 3 is detached and combined with another member to comprise a green cover (not shown). By vulcanizing this green cover, a pneumatic tire is obtained. In this regard, the wound body 9 may alternatively be formed directly on the above-mentioned green cover base body instead of on the molding former 3.

The winding start points 8As, 8Bs of the rubber strips are pressed by press rollers 5 as illustrated in FIG. 1 by virtual lines towards the molding surface U side. With this arrangement, the winding start ends 8As, 8Bs of the rubber strips 8A, 8B are fixedly attached to the molding surface U through their own adhesive force. After fixedly attaching the same, the press rollers 5 can be moved in a radial direction with respect to the molding surface U of the molding former 3 to positions at which they do not interfere the applicators 4.

Both the winding start end 8As of the first rubber strip 8A and the winding start ends 8Bs of the second rubber strip 8B are fixedly adhered to the molding surface U at positions inside in the width direction than both sides e1, e2 of the tread rubber TR (wound body 9). In other words, both the winding start point 8As of the first rubber strip 8A and the winding start end 8Bs of the second rubber strip 8B are not located at the sides e1 and e2 of the wound body 9.

In the present invention, a rubber strip that is used for forming a portion of the one side e1 is defined to be the first rubber strip 8A while a rubber strip that is used for forming a portion of the other side e2 is defined to be the second rubber strip 8B. In this respect, "forming portions of the sides e1, e2" denotes turnup portions where the rubber ribbon 8 is turned up at sides e1,e2 without cutting to continue winding. Therefore, the turnup portions are formed by a first layer 10 inward in the radial direction and a second layer 11 outside thereof that is turned up at the side.

According to this embodiment, the winding start end 8As of the first rubber strip 8A is provided between the other side e2 and a width center CL of the wound body 9 (wherein the position at the other side e2 is of course not included). The winding start end 8Bs of the second rubber strip 8B is provided between the one side e1 of the tread rubber TR and the width center CL (wherein the position of the one side e1 is of course not included).

Further, the present embodiment is arranged in that the winding start end 8As of the first rubber strip 8A is fixedly attached at a position that is substantially symmetric to the winding start end 8Bs of the second rubber strip 8B with respect to the width center CL of the tread rubber TR.

More particularly, the first rubber strip 8A is arranged in that a side surface 8As1 of its winding start end 8As on the one side e1 side is positioned at the width center CL in the present embodiment. The second rubber strip 8B is arranged in that a side surface 8Bs2 of its winding start end 8Bs on the other side e2 side is positioned at the width center CL in the present embodiment. In other words, when positions of the winding start ends 8As, 8Bs in the circumferential direction are to be aligned, the side surfaces 8As1, 8Bs2 of the winding start ends 8As, 8Bs will substantially contact with each other at width center CL as illustrated, for instance, in FIG. 4(A).

When the side surfaces 8As1, 8Bs2 are substantially in contact with each other at width center CL as mentioned above, it means that the winding start ends 8As, 8Bs of the first and second rubber strips are located at a width central portion of the wound body 9. In this respect, the width central potion cc of the wound body 9 is a region proximate of the width center CL of the tread rubber 2. A width of the width central portion cc denotes a region of of narrower one in the region of total 30% of a tread rubber maximum width RW around the width center CL, and a region falling within a double width of the rubber strip 8 from the width center CL.

As illustrated in FIG. 2, the winding start end 8As of the first rubber strip and the winding start end 8Bs of the second rubber strip are provided at positions that are shifted from each other in position in the circumferential direction at angle $\alpha$ ($\alpha \neq 0°$). While this angle $\alpha$ is not particularly defined, when it is too large, the device space will be large in view of layout of the applicators 4A, 4B. On the other hand, when it is too small, the first rubber strip 8A and the second rubber strip 8B might interfere when being intersected. In this view, the angle $\alpha$ is desirably in a range of approximately 10° to 40'. Further, the applicators 4A, 4B desirably include portions that guide the rubber strips 8 so as to extend in a tangential direction of the molding surface U when seen in a side view as illustrated in FIG. 2. This portions are preferable to reduce an action of excess external force on the rubber strips 8 as much as possible.

Next, the molding former 3 is rotated in a direction as illustrated in FIG. 2, and the applicators 4A, 4B are moved outside in the direction of the tire rotational shaft. The rubber strips 8A, 8B are spirally wound around the molding surface U. The first rubber strip 8A is spirally wound towards the one side e1 up to the one side e1. The second rubber strip 8B is spirally wound towards the other side e2 up to the other side e2. In this manner, a process of forming the first layer 10 is performed (first winding step).

Performing winding outwardly in the direction of the rotational shaft (width direction) in the above manner is also preferable in view of the fact that air between the molding former 3 and the rubber strips 8 is expelled out to both sides in the width directions.

For instance, when the molding former 3 is rotated at constant velocity, it is possible to change the spiral pitch P of winding the rubber strips 8 by controlling the moving velocity of the applicators 4 in the direction of the tire rotational shaft.

By reducing the moving velocity of the applicators 4, it is possible to reduce the spiral pitch P. In this case, overlapping widths of adjoining rubber strips 8 are increased to make the thickness of such portions large. On the other hand, by increasing the moving velocity of the applicators 4, it is possible to increase the spiral pitch P. In this case, overlapping widths of adjoining rubber strips 8 are reduced to make the thickness of such portions small or substantially zero so that the thickness of such portions can be controlled to be even thinner. The spiral pitch P, that is, the moving velocity of the applicators is preliminarily determined on the grounds of the desired sectional shape of the tread rubber TR, the sectional shape of the rubber strips 8 and the rotational velocity of the molding former 3. Such informations are input to a controller for moving velocity control (not shown) of the applicators 4A, 4B (not shown), and movements of the applicators 4 are controlled on the basis thereof. While the winding pitch P (spiral pitch P) is not particularly limited, it is desirably 3 to 10 mm, and more preferably 5 to 7 mm.

According to the present embodiment, the winding start end 8As of the first rubber strip 8A is located between the other side e2 and the width center CL of the wound body 9 as mentioned above. The winding start end 8Bs of the second rubber strip is located between the one side e1 and the width center CL of the tread rubber TR. Moreover, the winding start ends 8As, 8Bs are shifted in position in the circumferential direction as mentioned above. Accordingly, the first and second rubber strips 8A, 8B are sequentially wound up from the start ends 8As, 8Bs with the rotation of the molding former 3 as illustrated in FIG. 2. The first rubber strip 8A and the second rubber strip 8B intersect at the width center CL of the tread rubber TR (wound body 9) without interfering and are successively wound up. By thus intersecting the rubber strips 8 at the width center CL, it is possible to eliminate spaces that are apt to be formed at the width center portion of the wound body 9.

In the present embodiment, the first applicator 4A and the second applicator 4B are simultaneously controlled during the first winding step. More particularly, while moving directions of the respective applicators 4A, 4B are opposite to each other, they are controlled to have a substantially identical moving velocity at an arbitrary time. Accordingly, in the first winding step, the respective applicators 4A, 4B (that is, the first rubber strip 8A and the second rubber strip 8B) are positioned substantially symmetrical with respect to the width center CL at an arbitrary time. When the first rubber strip 8A has reached the one side e1, the second rubber strip 8B can be made to reach the other side e2. Accordingly, when compared to a case in which a rubber strip 8 is successively wound in a spiral manner from the one side e1 to the other end side e2 by using a single applicator, it is possible to shorten the winding time to improve the productivity. The first layer 10 formed by the first winding step has a width RW that continues from the one side e1 to the other side e2. The winding structure of the rubber strips 8 (the boundary of the rubber strips 8) will be substantially plane symmetrical with respect to a vertical face including the width center CL.

Figure 17:
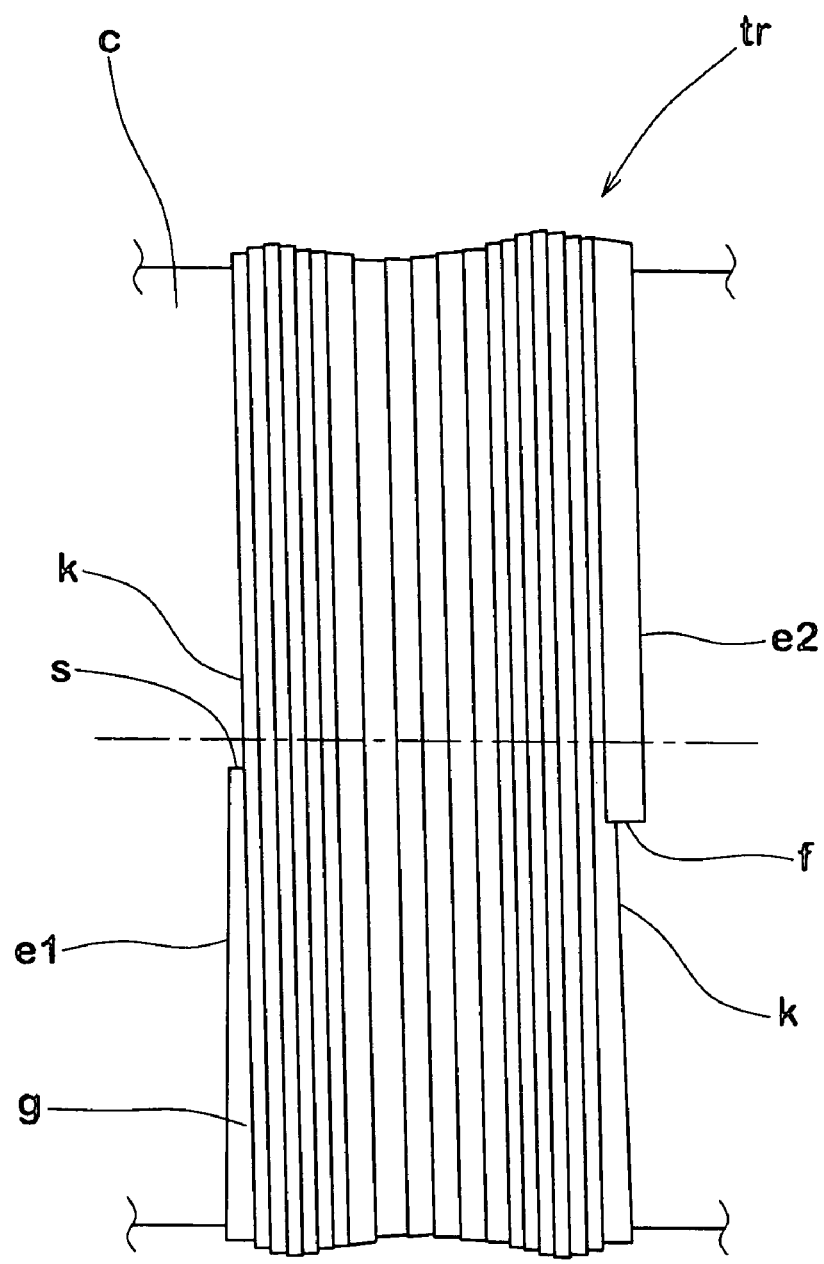
FIG. 17 is a plan view illustrating a wound condition of a wound body for a conventional tread rubber.
Figure 18:
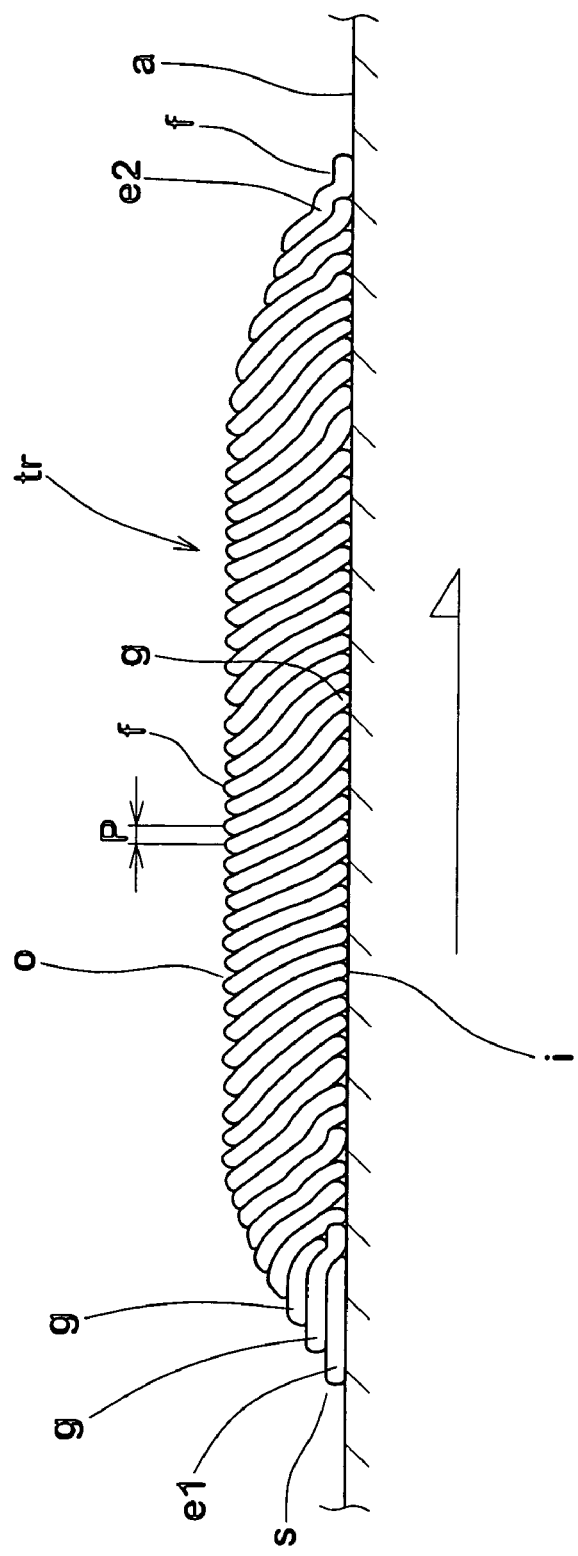
FIG. 18 is a sectional view illustrating another wound body for a tread rubber obtained through winding steps corresponding to those of FIG. 14.

In a particularly preferable embodiment, the first rubber strip 8A is wound along the one side e1 in the circumferential direction by an arbitrarily small length. With this arrangement, it is desirable to include a step of eliminating non-continuous portions k as shown in FIG. 17. It is desirable to similarly wind an arbitrary length at the other side e2 along the circumferential direction also for the second rubber strip 8B. The length of winding of the rubber strips 8 along the circumferential direction at respective sides e1, e2 can be suitably set in accordance with spiral pitches or widths W of the rubber strips 8. This serves to uniformize the sectional shape of the tread rubber in the circumferential direction.

In the present embodiment, the first rubber strip 8A is then turned up at the one side e1 without being cut and is spirally wound towards the other side e2. By turning up the second rubber strip 8B at the other side e2 and spirally wound towards the one side e1, a second winding step of successively forming a second layer 11 outside of the first layer 10 is performed.

In the second step, the first applicator 4A and the second applicator 4B are similarly controlled in a mutually simultaneous manner. That is, while moving directions of the respective applicators 4A, 4B are opposite to each other, they are controlled to have a substantially identical moving velocity at an arbitrary time. Accordingly, in the second winding step, the respective applicators 4A, 4B (that is, the first rubber strip 8A and the second rubber strip 8B) are positioned substantially plane symmetrical to each other with respect to the radial plane including the width center CL of the tread rubber TR. Similar to the first winding step, when compared to a case in which a rubber strip is successively wound in a spiral manner from the one side e1 to the other end side e2 by using a single applicator, it is possible to shorten the winding time to improve the productivity.

In this manner, after forming the first layer 10, the rubber strip 8 is successively wound outside thereof without being cut to form the second layer 11. Accordingly, the rubber strips 8 can be successively wound without being interrupted between the first winding step and the second winding step so that the productivity can be improved.

In the second winding step, the spiral pitch of the rubber strips 8A, 8B at positions of the wound body 9 outside in the width direction is defined to be relatively small. By relatively increasing the spiral pitch on the width central side, the thickness is formed to gradually reduce towards the width central side in a smooth manner. This approximates a sectional shape of a tread rubber obtained through a conventional extruding method. It will accordingly be possible to manufacture tires by continuously using conventional tire vulcanizing metallic molds (dies).

A second winding step of positioning a winding end point 8Af of the first rubber strip and a winding end point 8Bf of the second rubber strip inward of the respective sides e1, e2 in the width direction is then performed. Upon completion of the second winding step, the first and second rubber strips 8A, 8B are cut. A fixing step of fixedly attaching the winding end points 8Af, 8Bf by pressing end portions to the specified positions by means of the press rollers 5 is then performed. Cutting of the first and second rubber strips 8A, 8B is automatically performed by using a cutting tool or similar (not shown).

Figure 4E:
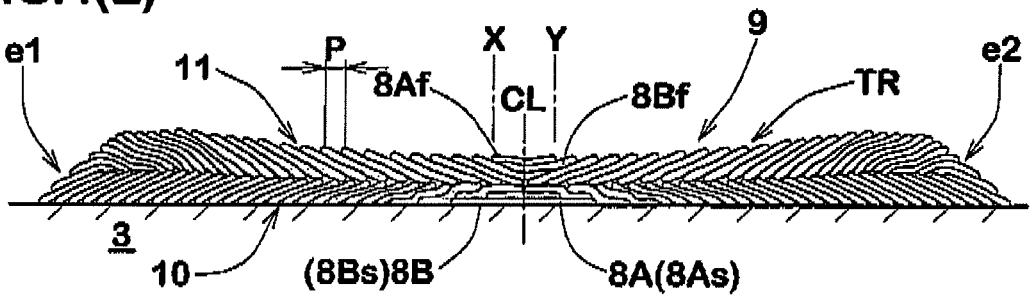
Figure 10A:
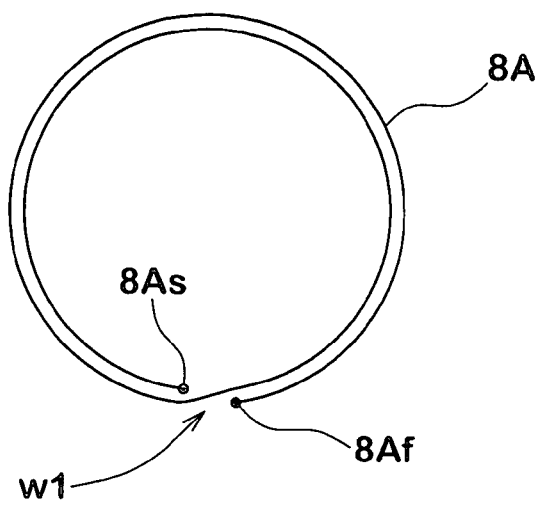
FIG. 10(A) is a sectional diagram of position X in FIG. 4(E)
Figure 10B:
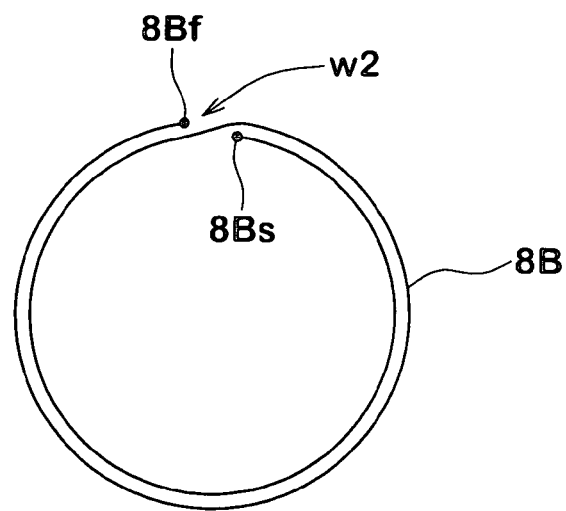
FIG. 10(B) is a diagram illustrating a section at position Y in FIG. 4(E)

FIGS. 10(A) and 10(B) illustrate an exemplary embodiment of the invention different from the embodiment of FIG. 2 in which the wound body 9 is obtained through the first and second winding steps along the X- and Y-section in FIG. 4(E). A position w2 of the winding end point 8Bf of the second rubber strip 8B is desirably provided apart from a position w1 of the winding end point 8Af of the first rubber strip 8A by substantially 180 degrees in the circumferential direction. With this arrangement, the uniformity of the rubber gauge and the weight balance can be further improved to thus further improve the uniformity of the tire.

As illustrated in FIGS. 10(A) and 10(B), it is desirable to position the winding end points 8Af, 8Bf of the rubber strips 8A, 8B in the frontward the winding start points 8As, 8Bs in the winding circumferential direction and near the winding start points 8As, 8Bs for the purpose of improving the uniformity.

The present embodiment is further arranged in that the winding end point 8Af of the first rubber strip is fixedly attached to a position that is substantially symmetric to the winding end point 8Bf of the second rubber strip with respect to the width center of the wound body 9 (substantially identical to the tread rubber TR). As illustrated in FIG. 4(E), the winding end points 8Af, 8Bf on the width center CL of the tread rubber TR overlap each other at the width center of the wound body 9 in the present embodiment. According to the present embodiment, the end points 8Af, 8Bf are thus positioned in a region of the width center CL (width central portion cc).

With such a wound body 9, it is possible to obtain a substantially plane symmetric sectional shape not only with regards to the contour shape but also including the winding structure of the first and second rubber strips 8A, 8B with respect to the radial plane including the width center CL. Moreover, all of the winding start points 8As, 8Bs and the winding end points 8Af, 8Bf of the first and second rubber strips 8A, 8B are positioned further inward in the width direction than the sides e1, e2. Such a tread rubber TR makes the sectional shape uniform in the circumferential direction and improves the uniformity of the tire. Damages such as cracks or rubber chippings that originated from the fact that winding start points or winding end points of the rubber strips 8 were positioned at sides e1, e2 can also be prevented.

Figure 5A:
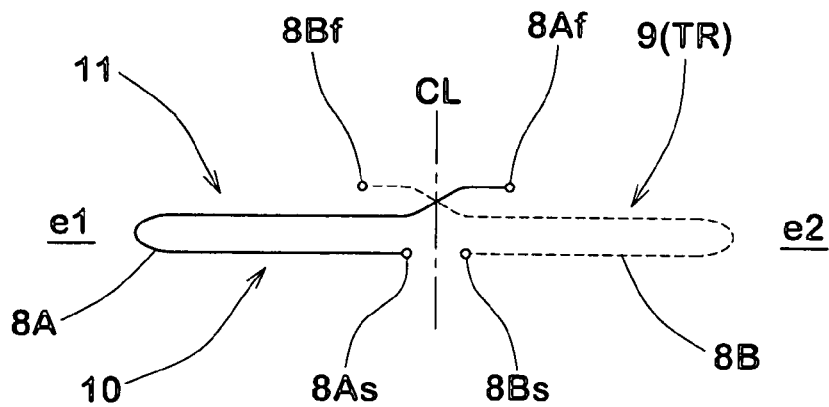
FIGS. 5(A) to 5(C) are diagrams illustrating three examples of tracks of winding rubber strips.
Figure 5B:
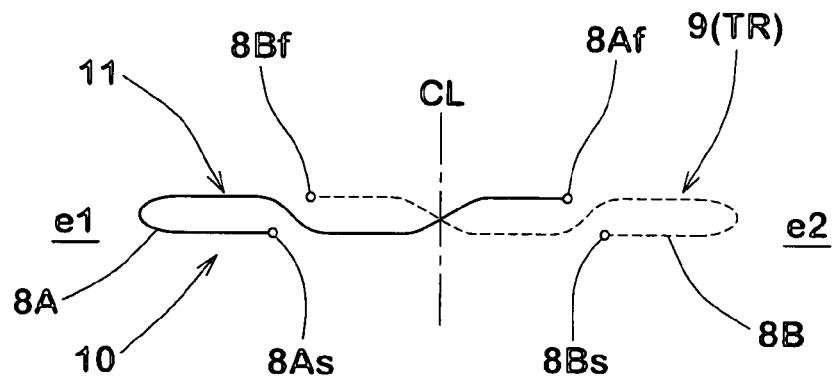

FIG. 5(A) to 5(B) schematically shows another embodiments in which winding start points and winding end points of the first and second rubber strips 8A, 8B are made different. In the embodiment of FIG. 5(A), the winding start point 8As of the first rubber strip 8A is provided between the width center CL and the one side e1. The winding start point 8Bs of the second rubber strip 8B is provided between the width center CL and the other side e2. The winding end point 8Af of the first rubber strip 8A is provided between the width center CL and the other side e2. The winding end point 8Bf of the second rubber strip 8B is provided between the width center CL and the one side e1. While the winding start points 8As and 8Bs do not intersect at the width center CL, they intersect with each other in the course of reaching the winding end points 8Af and 8Bf. With this arrangement, it is possible to secure a thickness for a central portion of the tread rubber TR.

Figure 5C:
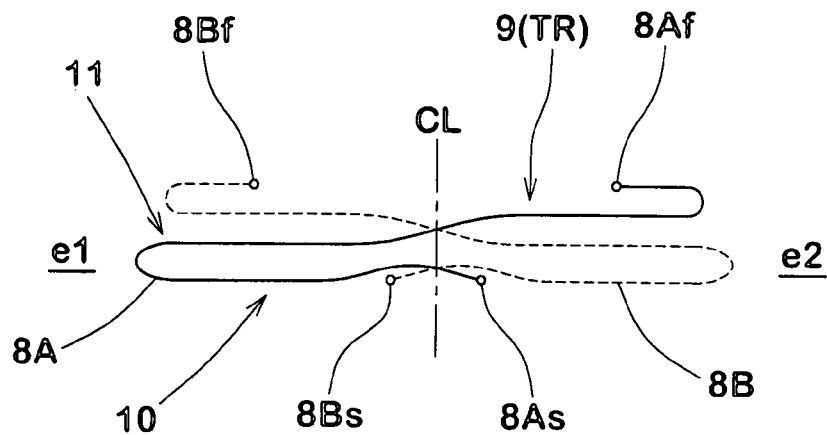

The embodiment of FIG. 5(B) is in common with the embodiment of FIG. 5(A). In the embodiment of FIG. 5(B), all of the winding start points 8As, 8Bs and the winding end points 8Af, 8Bf are provided substantially intermediate of the width center CL and the side e1 or e2. FIG. 5(C) further illustrates a case in which the rubber strips 8A, 8B are further turned up at sides e1, e2 and wound to the width center CL side in the second winding step. In this manner, the winding start points and the winding end points of the rubber strips 8A, 8B can be provided at desired positions. In this manner, it is also possible to comprise a turned-up body including three and more layers.

The above embodiments illustrated examples in which the entire tread rubber TR was comprised of the first and second rubber strips 8A, 8B. It is, however, possible to comprise only a part of the tread rubber TR. For instance, where the tread rubber TR has multiple portions of different rubber compositions (FIGS. 6(A), 6(B) and 7), it is comprised of three layers. A case is illustrated in such an instance in which at least one layer (the rubber layer on the outermost side in the radial direction in the case of FIGS. 6(A), 6(B) and 7) is manufactured according to the method of the present invention.

Figure 6A:
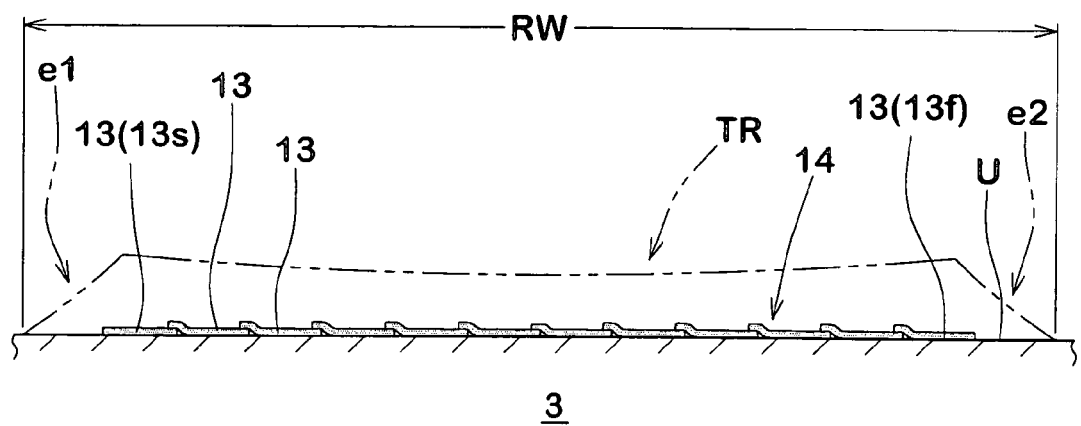
FIG. 6(A) is a sectional view illustrating a case that is provided with an under layer.

As illustrated in FIG. 6(A), prior to the first winding step, an under layer 14 is first formed on the molding surface U of the molding former 3. The under layer 14 is formed through an under layer forming step in which a third rubber strip 13 is spirally wound in the circumferential direction from a portion near the one side e1 towards a portion near the other side e2. In this example, an under layer 14 of small width is formed by slightly overlapping sides of the third rubber strip 13 in a width direction.

Since the under layer 14 is adhered to the belt layer, it is preferable to employ a rubber composition that exhibits superior adhesiveness with, for instance, a topping rubber of the belt layer. A winding start point 13s and a winding end point 13f of the under layer 14 are also positioned further inside in the width direction than both sides e1 and e2 of the tread rubber TR. With this arrangement, it is prevented also in the under layer 14 that the winding start point 13s and the winding end point 13f of the rubber strip are located at the sides e1 and e2 of the tread rubber TR. It is accordingly possible to effectively prevent cracks or rubber peeling formed in the under layer 14 at sides of the tread rubber. Further, since the width of the belt layer is generally smaller than the width RW of the tread rubber, the under layer 14 is allowed to be of small width in this manner.

Figure 6B:
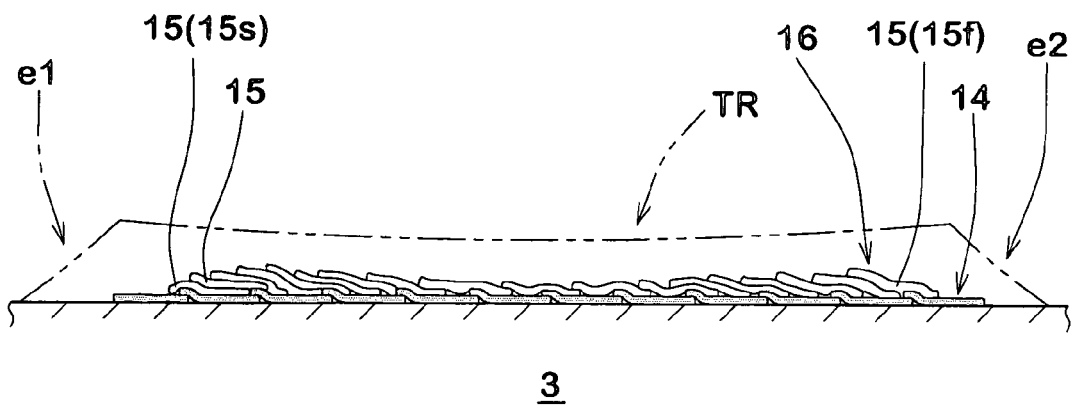
FIG. 6(B) is a sectional view illustrating a case that is provided with an under layer and a middle layer.

As illustrated in FIG. 6(B), a fourth rubber strip 15 having a rubber composition other than that of the third rubber strip 13 is spirally wound from a portion near the one side e1 towards a portion of the other side e2. Through this winding, a middle layer 16 is formed outside of the under layer 14. This process is referred to as a "middle layer forming step". The middle layer 16 is arranged in that sides of the fourth rubber strip 15 are overlapped with each other for winding. Since the middle layer 16 is disposed, for instance, inside of the tread rubber TR, it is desirable that it has a rubber composition of low heat-generating properties and of small energy loss.

A winding start point 15s and a winding end point 15f of the fourth rubber strip 15 that forms the middle layer 16 are also positioned further inside in the width direction than both sides e1 and e2 of the tread rubber TR. With this arrangement, the winding start point 15s and the winding end point 15f will not be positioned at the sides e1 and e2 of the tread rubber TR so that cracks or rubber peelings of the middle layer 16 at the sides e1, e2 of the tread rubber TR can be effectively prevented.

Outside of the under layer 14 and the middle layer 15, a cap layer 17 is formed. This cap layer 17 is the wound body 9 according to the present invention, and is formed of the first rubber strip 8A and the second rubber strip 8B. FIG. 7 illustrates a sectional view of a tread rubber TR formed in this manner. The tread rubber TR is formed of a plurality of layers (three layers) of different rubber compositions. Since the tread rubber TR is arranged in that winding start points and winding end points of the rubber strips 8A, 8B, 13 and 15 that comprise all layers are provided further inside (width center side) than the sides e1 and e2 of the tread rubber TR (sides e1, e2 of the wound body 9 that comprises the cap layer 17 of the tread rubber), it is possible to more reliably prevent cracks or the like from being formed at the winding start points and winding end points of the rubber strips and to improve the durability of the rubber member.

Figure 8A:
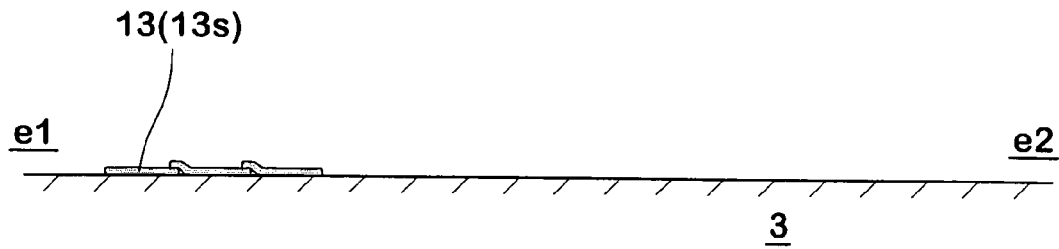
FIGS. 8(A) to 8(D) are sectional views illustrating steps for forming an under layer and a middle layer.
Figure 8B:
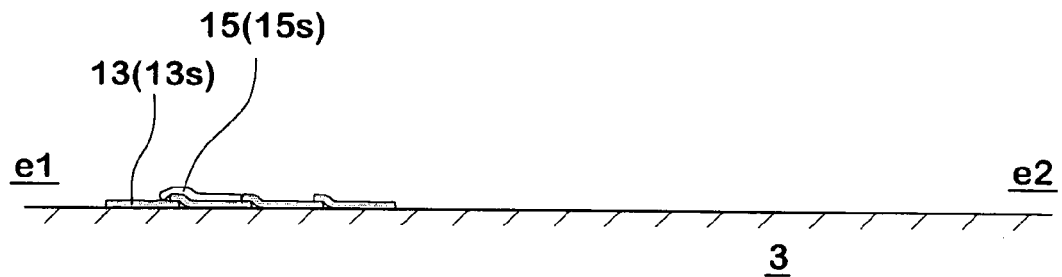
Figure 8C:
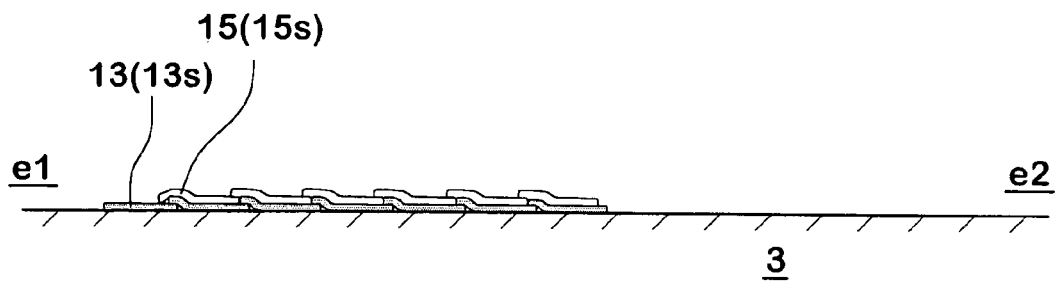
Figure 8D:
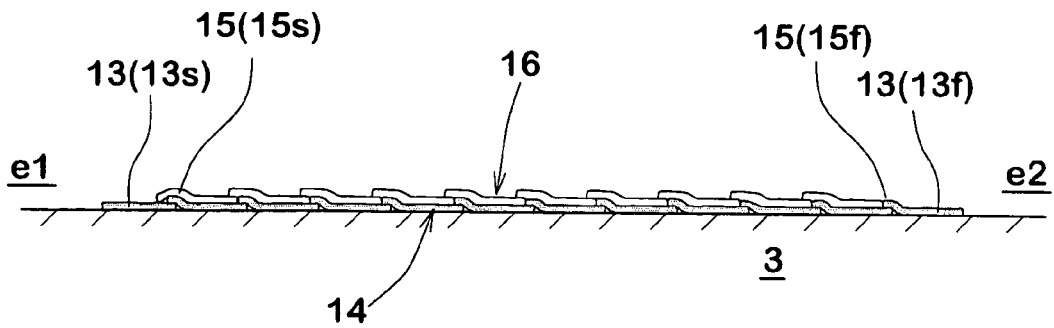

While winding of the fourth rubber strip 15 that forms the middle layer 16 can be started upon entire completion of winding of the under layer 14, an idle time will be generated in such an instance so that the productivity is degraded. It is preferable that winding of the fourth rubber strip 15 is started during a period after start of winding up to end of winding of the third rubber strip 13 as illustrated in FIGS. 8(A) to 8(D). More particularly, as illustrated in FIG. 8(A), the third rubber strip 13 is first wound onto the molding former 3 to form a specified width. At this point of time, winding of the third rubber strip 13 is once terminated, and the winding start point 15s of the fourth rubber strip 15 is fixed outside thereof (FIG. 8(B)). It is preferable to simultaneously wind the third rubber strip 13 and the fourth rubber strip 15 towards the other side e2 side thereafter. In this manner, it is possible to shorten the time required for winding the rubber strip 15 to thus further improve the productivity.

FIG. 9 illustrates a partial enlarged view of the tread portion of a pneumatic tire 1 including a tire rubber member according to the above-described embodiment. In this embodiment, a pneumatic tire for heavy-duty purposes employed in trucks and buses is illustrated. The pneumatic tire 1 includes a carcass 21 made of steel cords and a belt layer 22 disposed outside thereof, and a tread rubber 23 is disposed outside of the belt layer 22.

At least a part of the tread rubber 23 is formed by using the wound body 9 formed by the above-described method. The winding start points 8As and 8Bs of the first and second rubber strips are located further inside in the width direction than the tread edges eT1, eT2. Similarly, the winding end points 8Af and 8Bf of the first and second rubber strips are located further inside in the width direction than tread edges eT1, eT2. Such a pneumatic tire serves to improve the uniformity of the tire and durability of the tread rubber since the winding start points and end points of the rubber strips will not be located at the tread edges eT1, eT2 and side surfaces Te1, Te2 extending therefrom. In this respect, also after vulcanization, boundary surfaces of the rubber strips 8 slightly appear in section when the tire is cut by a sharp cutting tool. Positions of the winding start ends 8As, 8Bs and winding end points 8Af, 8Bf can accordingly be specified.

FIGS. 11(A) to 11(C) illustrate another embodiment. The tread rubber according to the present embodiment is obtained by using a single rubber strip 8. First, as illustrated in FIG. 11(A), a start point 8s of winding of the rubber strip 8 is fixedly attached to a width central portion cc of a wound body 9. The strip is then spirally wound towards one end edge e1 up to the end edge e1. With this arrangement, substantially a half portion 10a of the first layer 10 of the tread rubber TR is formed.

Then, the rubber strip 8 that has been wound up to the end portion at side e1 of the tread rubber TR is spirally wound around towards the width center portion without being cut at the end portion at side e1. With this arrangement, substantially a half portion 11a of the second layer 11 can be formed outside of the first layer 10 in the radial direction (FIG. 11(B)).

The rubber strip 8 that has been wound around up to the width center portion is spirally wound as it is towards the other end portion at side e2 up to this end portion at side e2. With this arrangement, the remaining substantially half portion 10b of the first layer 10 is formed. The rubber strip 8 is then spirally wound around in a repeated manner from the end portion at side e2 to the width center portion without being cut at the end portion at side e2. With this arrangement, the remaining substantially half portion 11b of the second layer 11 can be formed (FIG. 11(C)).

In the tread forming step of the present embodiment, the wound body 2 for the tread rubber TR that is substantially similar to those of FIGS. 1 and 2 can be formed by using a single rubber strip 8 so that this serves to simplify equipments for forming tread rubbers.

Figure 12:
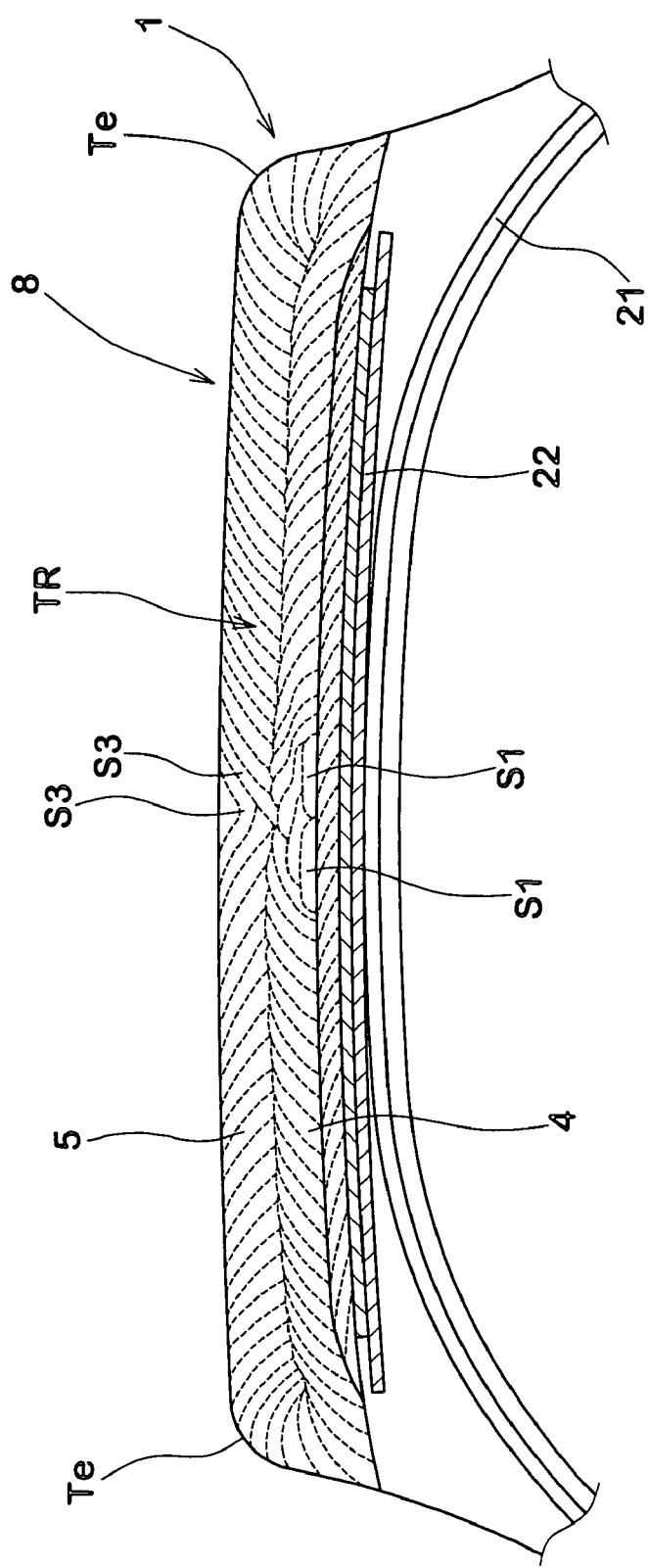
FIG. 12 is an enlarged view of another tread portion of a pneumatic tire that is manufactured in accordance with the method of the present invention.
Figure 13:
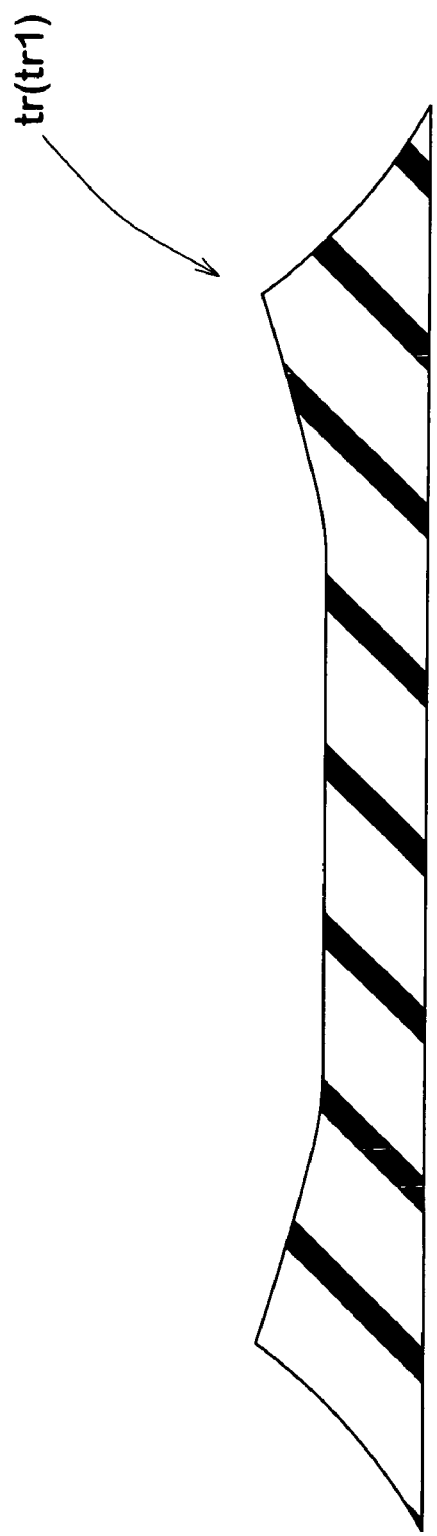
FIG. 13 is a sectional view illustrating a tread rubber formed through integral extrusion according to the prior art.

FIG. 12 illustrates a partially enlarged view of the pneumatic tire 1 manufactured by using the above-described tread rubber 8. The pneumatic tire 1 includes a toroidal carcass 21 and a belt layer 22 disposed outside thereof, and the tread rubber TR is disposed outside of the belt layer 22.

While embodiments of the present invention have been explained so far, the present invention is applicable not only to tread rubbers but also to sidewall rubbers, inner liners or cushion rubbers as long as they are annular tire rubber members. The rubber members obtained through the present invention are applicable not only to pneumatic tires for heavy-duty purposes but also to pneumatic tires of various categories.

EXAMPLES

Twenty pneumatic tires for heavy-duty purpose of a tire size of 11R22.5R each were manufactured by using a plurality of types of non-vulcanized tread rubbers according to the specifications as illustrated in Table 1. Except the tread rubbers, tread patterns and internal structures were common to all. Uniformity and durability of the tread rubber were evaluated for all of those.

Methods of evaluation were as follows.

<Uniformity>

Radial runouts (RRO) were measured for each sample tire (average value of n=20) and indicated as indices with the RRO of the Comparative Example 1 being defined as 100. The smaller the values are, the more preferable they are.

<Durability of Tread Rubber>

The sample tires were attached to a rim of 7.50□22.5 and were made to run on a drum of 1.7 m radius at an air pressure of 700 kPa, a load of 50 kN and a velocity of 100 km/h over 50,000 km, and the tread rubbers were then visually observed and split after the visual observation to check internal damage conditions.

Test results are indicated in Table 1.

TABLE 1

Figure 14:
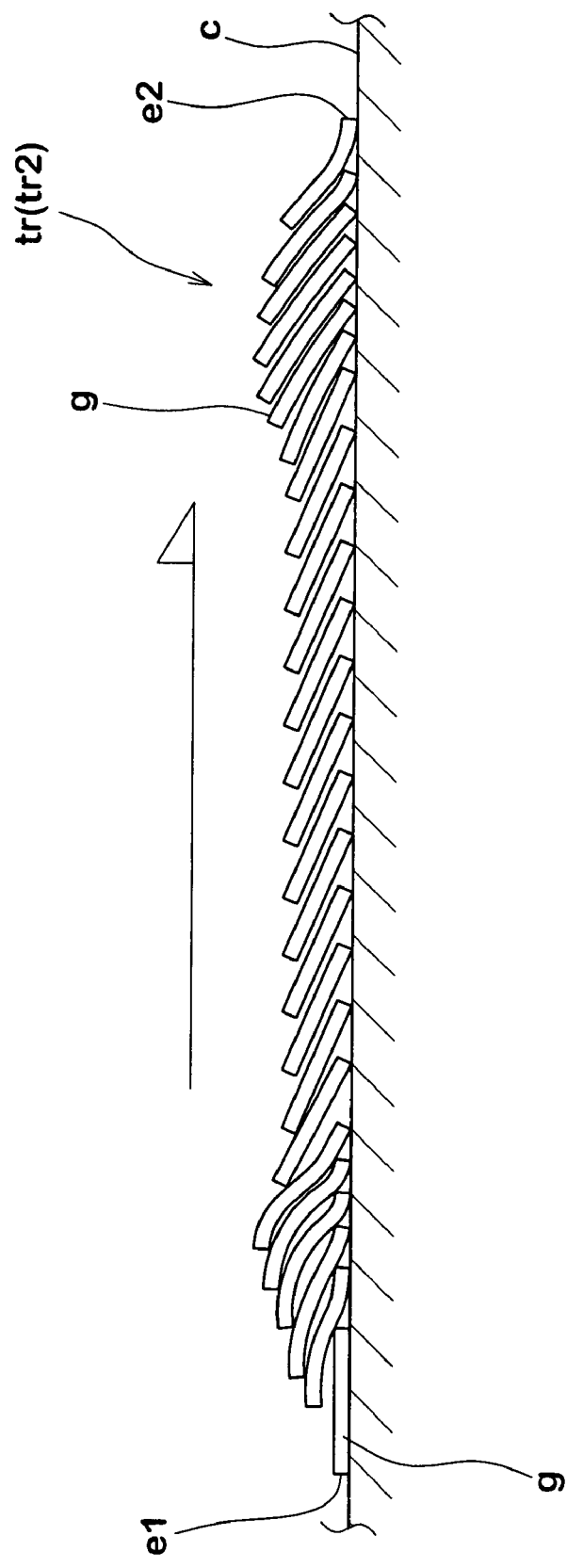
FIG. 14 is a sectional view illustrating a wound body for a tread rubber obtained through a conventional strip-wind method.
Figure 15:
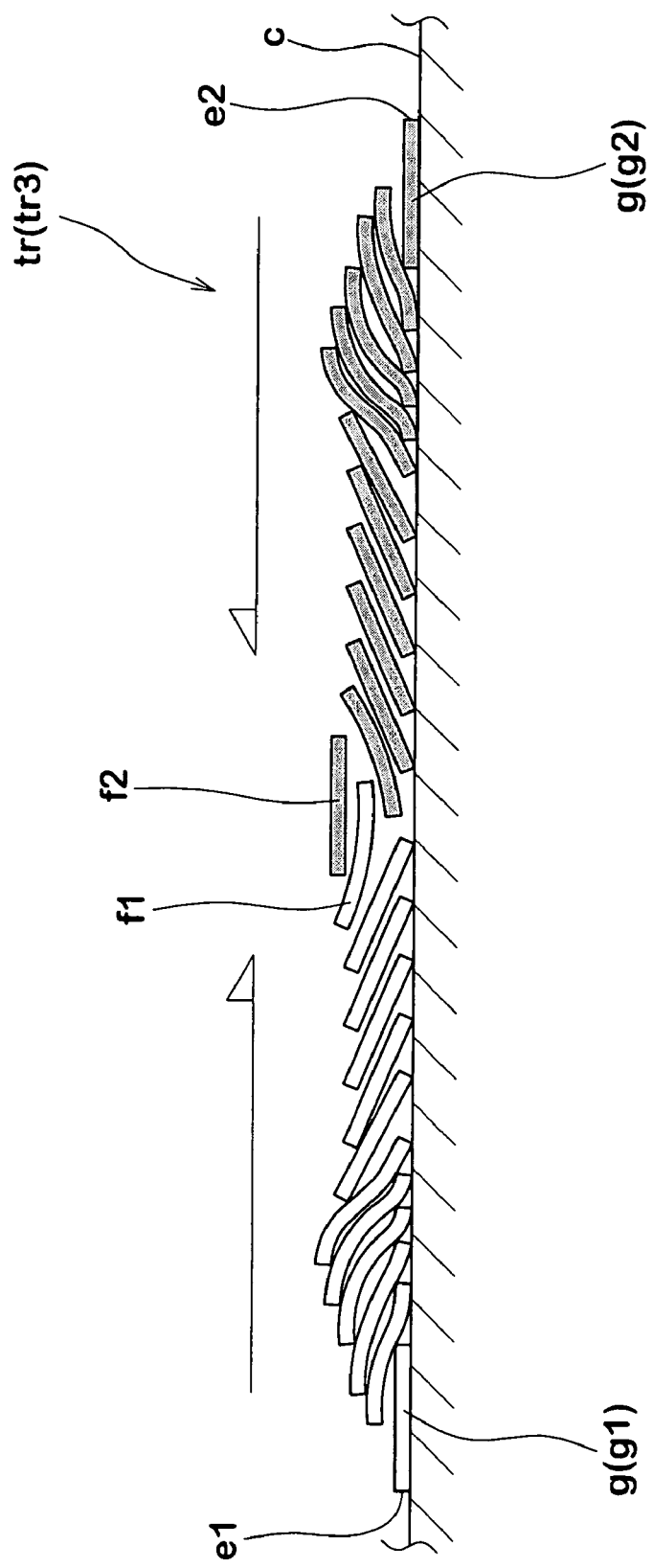
FIG. 15 is a sectional view illustrating another wound body for a tread rubber obtained through a conventional strip-wind method.
Figure 16:
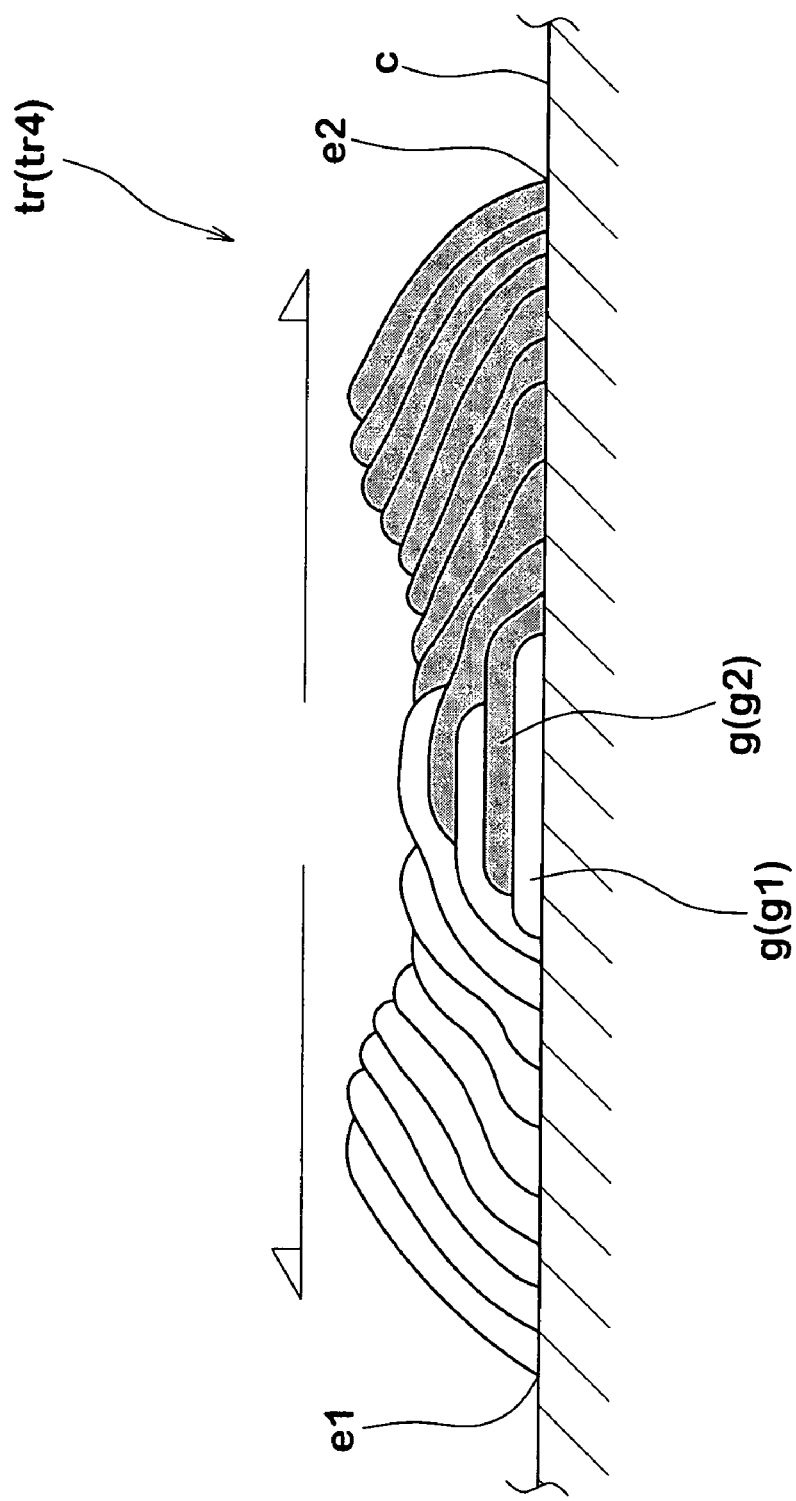
FIG. 16 is a sectional view illustrating still another wound body for a tread rubber according to a conventional strip-wind method.

|  | Example | Comparative Example 1 | Comparative Example 2 | Comparative Example 3 |
| --- | --- | --- | --- | --- |
| Drawing illustrating the tread rubber structure | FIG. 4 | FIG. 14 | FIG. 15 | FIG. 16 |
| Uniformity (index) (RRO) | 95 | 100 | 105 | 105 |
| Durability of tread rubber (visual observation) | No cracks or wrinkles found | Minute cracks formed proximate of tread edges | No cracks or wrinkles found | No cracks or wrinkles found |
| Durability of tread rubber (check upon splitting) | No cracks or wrinkles found | Minute cracks formed proximate of tread edges | Minute cracks formed proximate of tread edges | Minute cracks formed proximate of tread edges |

It could be confirmed through the test results that tires of the examples were improved in uniformity and durability of tread rubbers when compared to those of the Comparative Examples.

What is claimed is:

1. A method for manufacturing a pneumatic tire including an entire tread rubber or a cap layer, said entire tread rubber or cap layer being formed by using an annular wound body obtained by winding ribbon-like non-vulcanized rubber strips in a spiral manner, and the method including:

a step of fixedly attaching a winding start point of a first rubber strip and a winding start point of a second rubber strip to an object to be wound at positions located further inward in a width direction than the respective sides of the wound body, a winding step for forming the entire tread rubber or the cap layer, comprising a first winding step for forming a first layer by spirally winding the first rubber strip towards one side up to the one side and by spirally winding the second rubber strip towards the other side up to the other side, and a second winding step for successively forming a second layer outside of the first layer by turning the first rubber strip up at the one side and spirally winding the same towards the other side without cutting the same at the one side and by turning the second rubber strip up at the other side and spirally winding the same towards the one side without cutting the same at the other side, and a step of fixedly attaching a winding end point of the first rubber strip and a winding end point of the second rubber strip at positions located further inward in the width direction than the respective sides of the wound body, wherein said winding start point of the first rubber strip is provided between the other side of the wound body and a width center of the wound body such that the first rubber strip, at its winding start point, has a side surface, on the side thereof that faces the one side of the wound body, located at the width center, and the winding start point of the second rubber strip is provided between the one side of the wound body and the width center of the wound body such that the second rubber strip, at its winding start point, has a side surface, on the side thereof that faces the other side of the wound body, located at the width center so that the first rubber strip and the second rubber strip intersect with each other at the width center of the wound body in the first winding step.

2. The method for manufacturing a pneumatic tire as claimed in claim 1, wherein the position of the winding end point of the first rubber strip in the width direction is substantially symmetric to the position of the winding end point of the second rubber strip in the width direction with respect to the width center of the wound body.

3. The method for manufacturing a pneumatic tire as claimed in claim 1, wherein the first rubber strip and the second rubber strip are of identical rubber composition and of identical sectional shape.

4. The method for manufacturing a pneumatic tire as claimed in claim 1, further including an under layer forming step for forming an under layer inside of the first layer by spirally winding a rubber strip on the object to be wound from one side to the other side prior to the first winding step.

5. The method for manufacturing a pneumatic tire as claimed in claim 4, further including a middle layer forming step between the under layer forming step and the first winding step for forming a middle layer between the under layer and the first layer by spirally winding a rubber strip from one side to the other side.

6. A pneumatic tire provided with a tread rubber or a cap layer at a tread portion thereof, wherein the entire tread rubber or cap layer is composed of a strip laminated body including:

a first layer composed of a wound body in which a first rubber strip and a second rubber strip, which respectively include winding start points that are located further inside in a width direction than tread edges, are spirally wound towards the tread edges in opposite directions in the width direction up to one side and the other side of the wound body, respectively, such that the winding start point of the first rubber strip is provided between the other side of the wound body and a width center of the wound body and, at its winding start point, a side surface of the first rubber strip, on the side thereof that faces the one side of the wound body, is located at the width center, and the winding start point of the second rubber strip is provided between the one side of the wound body and the width center of the wound body and, at its winding start point, a side surface of the second rubber strip, on the side thereof that faces the other side of the wound body, is located at the width center so that the first rubber strip and the second rubber strip intersect with each other at the width center of the tread rubber; and a second layer composed of a wound body that is successively formed outside of the first layer by spirally winding the first rubber strip and the second rubber strip towards a tire equator upon turning the same up without cutting the same at tread edges at respective sides thereof with winding end points of the first rubber strip and the second rubber strip being provided further inward in the width direction than the tread edges.

7. A method for manufacturing a pneumatic tire including an entire tread rubber or a cap layer, said entire tread rubber or cap layer being formed by using an annular wound body obtained by winding ribbon-like non-vulcanized rubber strips in a spiral manner, and the method including:

a step of fixedly attaching a winding start point of a first rubber strip and a winding start point of a second rubber strip to an object to be wound at positions located further inward in a width direction than the respective sides of the wound body, a winding step for forming the entire tread rubber or the cap layer, the winding step consisting of a first winding step for forming a first layer by spirally winding the first rubber strip towards one side up to the one side and by spirally winding the second rubber strip towards the other side up to the other side, and a second winding step for successively forming a second layer outside of the first layer by turning the first rubber strip up at the one side and spirally winding the same towards the other side without cutting the same at the one side and by turning the second rubber strip up at the other side and spirally winding the same towards the one side without cutting the same at the other side, and a step of fixedly attaching a winding end point of the first rubber strip and a winding end point of the second rubber strip at positions located further inward in the width direction than the respective sides of the wound body, wherein said winding start point of the first rubber strip is provided between the other side of the wound body and a width center of the wound body such that the first rubber strip, at its winding start point, has a side surface on the side thereof that faces the one side of the wound body, located at the width center, and the winding start point of the second rubber strip is provided between the one side of the wound body and the width center of the wound body such that the second rubber strip, at its winding start point, has a side surface, on the side thereof that faces the other side of the wound body, located at the width center so that the first rubber strip and the second rubber strip intersect with each other at the width center of the wound body in the first winding step.

8. A pneumatic tire provided with a tread rubber or a cap layer at a tread portion thereof, wherein the entire tread rubber or cap layer is composed of a strip laminated body consisting of:

a first layer composed of a wound body in which a first rubber strip and a second rubber strip, which respectively include winding start points that are located further inside in a width direction than tread edges, are spirally wound towards the tread edges in opposite directions in the width direction up to one side and the other side of the wound body, respectively, such that the winding start point of the first rubber strip is provided between the other side of the wound body and a width center of the wound body and, at its winding start point, a side surface of the first rubber strip, on the side thereof that faces the one side of the wound body, is located at the width center, and the winding start point of the second rubber strip is provided between the one side of the wound body and the width center of the wound body and, at its winding start point, a side surface of the second rubber strip, on the side thereof that faces the other side of the wound body, is located at the width center so that the first rubber strip and the second rubber strip intersect with each other at the width center of the tread rubber; and a second layer composed of a wound body that is successively formed outside of the first layer by spirally winding the first rubber strip and the second rubber strip towards a tire equator upon turning the same up without cutting the same at tread edges at respective sides thereof with winding end points of the first rubber strip and the second rubber strip being provided further inward in the width direction than the tread edges.

* * * * *

UNITED STATES PATENT AND TRADEMARK OFFICE
CERTIFICATE OF CORRECTION

PATENT NO. : 7,617,854 B2
APPLICATION NO. : 11/187817
DATED : November 17, 2009
INVENTOR(S) : Hayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Nineteenth Day of October, 2010

David J. Kappos
*Director of the United States Patent and Trademark Office*